Patented Jan. 31, 1939

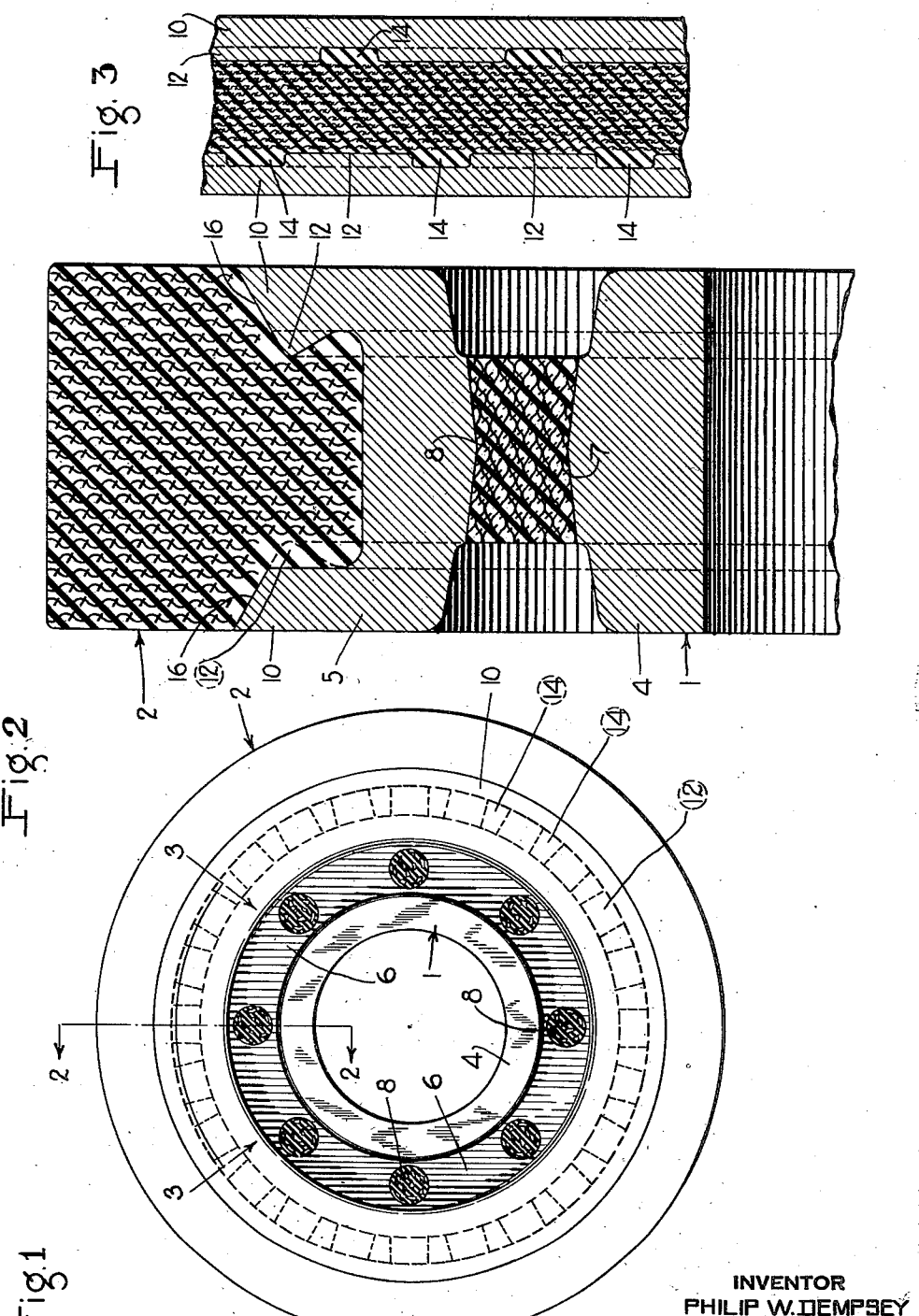

2,145,343

UNITED STATES PATENT OFFICE 2,145,343

MOVING STAIR ROLLER

Philip W. Dempsey, Pittsburgh, Pa., assignor to The Westinghouse Air Brake Company, Wilmerding, Pa., a corporation of Pennsylvania Application August 7, 1936, Serial No. 94,803

3 Claims. (Cl. 198—16)

This invention relates to a roller of a type adapted to be employed in moving stairways or escalators.

In moving stairways or escalators, chains or cables are employed which are supported at short intervals by rollers, and because of the length of these stairways a large number of rollers are required.

It is essential that these stairways or escalators operate quietly, and because of the large number of rollers employed, it is necessary to reduce to a minimum the noise produced by each roller.

These rollers support relatively heavy loads, and it is essential that the rollers be constructed so that they have sufficient strength to withstand these loads, while the faces of the rollers must have sufficient wear resistance that they will have a long life.

It is an object of this invention to provide an improved roller adapted for use on moving stairways or escalators.

A further object of the invention is to provide a roller which is adapted to support heavy loads, and which has a yielding, resilient surface which does not transmit vibrations so that the roller will operate quietly.

Another object of the invention is to provide an improved roller having a metallic hub portion, and a yielding, resilient tire or rim portion secured thereon in such a manner that the hub and tire or rim portions will not separate.

A further object of the invention is to provide an improved roller of the type described having a metallic hub portion, and having means to dampen vibrations in the hub portion and thus reduce the noise produced thereby.

Another object of the invention is to provide an improved roller of the type described, which can be constructed readily at low cost and which has a long life.

Other objects of the invention and features of novelty will be apparent from the following description taken in connection with the accompanying drawing, in which Fig. 1 is an elevational view of a roller embodying my invention, Fig. 2 is an enlarged sectional view taken substantially along the line 2—2 of Fig. 1, and Fig. 3 is a sectional view taken substantially along the line 3—3 of Fig. 1.

Referring to the drawing, the roller shown therein comprises a hub, indicated generally by the reference numeral 1, and a rim, indicated generally by the reference numeral 2.

The hub 1 is formed of suitable material, such as cast iron or aluminum, and has a central portion 4 and a peripheral portion 5 of substantially the same axial thickness, which are joined by a flange portion 6, which is somewhat thinner than the central and peripheral portions of the hub.

As is best shown in Figs. 1 and 2 of the drawing, the flange portion 6 has a plurality of holes 7 extending therethrough and spaced apart circumferentially thereof. These holes are conical, and each increases in diameter from a point intermediate the ends of the hole substantially to the faces of the flange portion. These holes are filled with bodies, indicated at 8, formed of rubber composition having fabric reinforcing embedded therein. These bodies are moulded in place under pressure so that they firmly engage the walls of the holes in which they are mounted.

The peripheral portion 5 has formed thereon adjacent the faces thereof radially extending flanges 10. Each of these flanges has formed on the axially inner face thereof an inwardly extending portion indicated at 12, which increases in thickness radially outwardly so as to form a generally dove-tailed channel extending around the circumference of the peripheral portion 5 of the hub.

Each of the flanges 10 has formed in the inner face thereof at points spaced apart circumferentially thereof, radially extending recesses 14, which are substantially the same axial depth as the inwardly extending portion 12 on the flange. The recesses 14 are of substantially less circumferential width than the spaces intermediate adjacent recesses, as is best shown in Fig. 3 of the drawing, while the recesses 14 on one of the flanges 10 are located substantially mid-way between the recesses on the other of the flanges 10.

The peripheral faces 16 of the flanges 10 are conical in form, decreasing in diameter away from the faces of the hub portion, and, as is best shown in Fig. 2 of the drawing, these surfaces extend across the inwardly extending portions 12 on the flanges 10.

The rim portion, which is indicated generally by the reference numeral 2, is formed of moulded rubber composition having fabric reinforcing material embedded therein. The rim portion 2 is constructed from a plurality of sheets of fabric impregnated with rubber composition and cut into discs, which are fitted over the hub portion 1. The discs which are positioned adjacent the middle of the hub have somewhat smaller holes therein than the discs located adjacent the faces of the hub portion, while the discs are of substantially the same diameter as the completed rollers. Enough discs are mounted on the hub so that when the discs are subjected to heavy pressure, the rim will be of substantially the thickness of the hub.

After a suitable number of discs are placed on the hub, the assembly is placed in cavities in suitable moulds, not shown, and subjected to pressure and heat for a time interval. This causes the rubber compound carried by the reinforcing fabric to be vulcanized, and a portion of this compound is forced into the spaces beneath the inwardly extending portions 12 on the flanges 10, and into the recesses 14 therein, while the material of the rim is pressed firmly against the face of the hub portion.

The bodies 8 are vulcanized in place in the holes 7 in the flange portion 6 at this time.

In use the roller is mounted on a shaft which extends through a bore in the central portion of the hub, and the load is supported on the periphery of the rim 2. Because of the shape of the faces 16 on the flanges 10, the material of the rim portion 2, when it is subjected to heavy weights, does not tend to spread, but instead the portions of the body of the rim which rest upon the surfaces 16 are forced against each other with the result that these forces off-set each other.

As the portions of the rim on opposite faces thereof are forced against each other, the central portion of the rim is tightly compacted and this limits displacement of the surface portions, with the result that there can only be a relatively small movement of the surface portions of the rim relative to the surfaces 16 on the hub, so that the rim will not become detached or loosened from the hub portion.

In addition, the material of the rim portion extends into the dove-tail channel in the hub, which also serves to prevent loosening of the rim on the hub, while the material of the rim extends into the recesses 14 in the flanges 10, as is clearly shown in Fig. 3 of the drawing, so as to prevent creeping or rotative movement of the rim relative to the hub.

The fabric reinforcing embedded in the material of the rim strengthens the rim and helps to prevent it from being permanently deformed by the loads imposed thereon, while the layers of fabric extend to the outer face of the rim and increase its resistance to wear by abrasion as a result of engagement therewith of the apparatus supported thereby.

As the rim 2 is formed of rubber composition it is resiliently yieldable so that it absorbs vibrations and does not transmit them between the hub and the supported apparatus, while substantially no noise is produced by engagement and disengagement of the supported apparatus with the face of the rim 2.

The hub 1 being formed of metal transmits vibrations readily. The flange portion 6, while relatively thick and of limited radial extent, if left intact, might emit vibrations which will produce an audible sound, but the roller provided by this invention has means to prevent these vibrations or to dampen them if they occur.

Thus it will be seen that the flange portion 6 has a plurality of holes extending therethrough, and that these holes are tightly filled with rubber composition, which is resiliently yieldable. If the flange portion 6 should vibrate, the bodies 8 will absorb and dampen these vibrations and thus reduce or eliminate noises which would otherwise be produced.

While one embodiment of the improved roller provided by this invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a device of the class described, in combination, a metallic hub having a central portion, a peripheral portion and a flange portion extending between said central and peripheral portions, the flange portion being of substantially less axial extent than the other portions and having openings extending therethrough at points spaced apart circumferentially thereof, said openings decreasing in diameter away from the faces of the said flange portions, each of said openings having a body of moulded composition therein in firm engagement with the walls thereof.

2. In a device of the class described, in combination, a metallic hub having a central portion, a peripheral portion and a flange portion extending between the said central portion and said peripheral portion, the flange portion being of substantially less axial extent than the other portions and having openings extending therethrough at points spaced apart circumferentially thereof, each of said openings having a body of moulded composition positioned therein in firm engagement with the walls thereof, the peripheral portion having spaced radially extending flanges thereon, said flanges having axially inwardly extending portions thereon located radially outwardly of the face of the hub portion, the peripheral face of each of the flanges being frusto-conical in form, the portions of said flanges of smallest diameter being located at the axially inner ends of said flanges, and a rim portion comprising a body of rubber composition having fabric reinforcing material embedded therein and moulded in place under pressure on said hub between said flanges, the rim extending over and being supported on said frusto-conical faces on said flanges.

3. In a device of the class described, in combination, a unitary metallic hub having spaced radially extending flanges formed thereon, said flanges each having an axially inwardly extending portion thereon in the form of an interrupted V-shaped annulus located radially outwardly of the face of the hub portion, whereby a portion of reduced width is provided radially outwardly of the face of the hub portion, and a rim portion formed of rubber composition moulded in position on said hub, the outer peripheral surfaces of said V-shaped portions merging with the outer peripheral edges of the flanges and thus forming frusto-conical faces having their portions of larger diameter located at the axially outer ends thereof, whereby when the material of which the rim is constructed is mounted on said hub and is subjected to pressure in the moulding process it will readily flow to the area adjacent the face of the hub and will fill the space radially inwardly of the V-shaped annular portions on said flanges, the rim extending over and being supported on the peripheral faces of said flanges.

PHILIP W. DEMPSEY.